United States Patent
Wan et al.

(10) Patent No.: US 8,508,206 B2
(45) Date of Patent: Aug. 13, 2013

(54) ADAPTIVE CONSTANT ON TIME ADJUSTMENT CIRCUIT AND METHOD FOR ADAPTIVELY ADJUSTING CONSTANT ON TIME

(75) Inventors: Yi-Cheng Wan, Taoyuan (TW);
Hung-Chun Peng, Dali (TW);
Jian-Rong Huang, Hsinchu (TW);
Kuo-Lung Tseng, Zhubei (TW)

(73) Assignee: Richteck Technology Corporation, Chupei, Hsin-Chu (TW)

( * ) Notice: Subject to any disclaimer, the term of this patent is extended or adjusted under 35 U.S.C. 154(b) by 321 days.

(21) Appl. No.: 12/928,097

(22) Filed: Dec. 3, 2010

(65) Prior Publication Data
US 2011/0304308 A1  Dec. 15, 2011

(30) Foreign Application Priority Data
Jun. 14, 2010  (TW) .............................. 99119326 A (51) Int. Cl.
*G05F 1/40* (2006.01)
(52) U.S. Cl.
USPC ........................................ 323/283; 363/21.18
(58) Field of Classification Search
USPC ................. 323/207, 209, 210, 223, 224, 266, 323/268, 271, 272, 274–277, 312–317; 363/16–20, 21.01, 60, 65, 89, 97, 21.13; 327/108, 111, 131, 132, 138, 176, 387, 407, 327/276, 349, 140, 424, 540
See application file for complete search history.

(56) References Cited

U.S. PATENT DOCUMENTS

| | | | | |
|---|---|---|---|---|
| 4,751,524 A | * | 6/1988 | Balchunas | 347/247 |
| 5,349,595 A | * | 9/1994 | Ogawa et al. | 372/38.02 |
| 5,502,410 A | * | 3/1996 | Dunn et al. | 327/140 |
| 5,592,128 A | * | 1/1997 | Hwang | 331/61 |
| 6,377,032 B1 | * | 4/2002 | Andruzzi et al. | 323/224 |
| 7,834,606 B2 | * | 11/2010 | Liu et al. | 323/283 |
| 7,932,709 B1 | * | 4/2011 | Ling | 323/285 |

* cited by examiner

*Primary Examiner* — Rajnikant Patel
(74) *Attorney, Agent, or Firm* — Tung & Associates (57) ABSTRACT

The present invention discloses an adaptive constant ON time adjustment circuit, which generates a square wave signal having a constant normal ON time during normal operation, for controlling a power stage circuit to convert an input voltage to an output voltage. When the output voltage is shifted from low to high, during the transient period, the ON time is adjusted longer; and when the output voltage is shifted from high to low, during the transient period, the ON time is adjusted shorter.

10 Claims, 8 Drawing Sheets

ADAPTIVE CONSTANT ON TIME ADJUSTMENT CIRCUIT AND METHOD FOR ADAPTIVELY ADJUSTING CONSTANT ON TIME

BACKGROUND OF THE INVENTION

1. Field of Invention

The present invention relates to an adaptive constant ON time adjustment circuit and a method for adaptively adjusting constant ON time, in particular to a circuit and a method for use in a DC-DC converter to improve transient ripple during mode transition.

2. Description of Related Art

Figure 1:
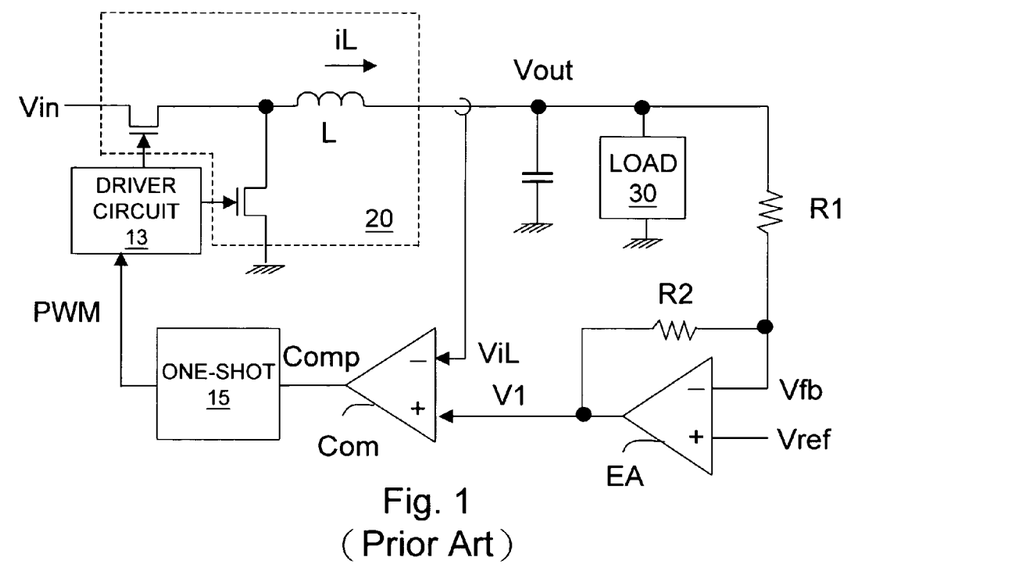
FIG. 1 shows a schematic diagram of a prior art buck constant ON time switching regulator.

Switching regulator can be classified into two types according to how its power switch is controlled: pulse-width modulation type and frequency modulation type. In a frequency modulation type switching regulator, a circuit controlling the power switch generates a constant ON time so that the power switch is turned ON for the same time period every cycle. The whole circuitry, by modulating the frequency, adjusts the level of an output voltage to regulate the voltage to a target value. Please refer to FIG. 1, wherein a buck switching regulator is taken as an example. In a prior art constant ON time switching regulator, an error amplified signal V1 is generated by an error amplifier EA which compares a feedback signal Vfb representing an output voltage Vout with a reference voltage Vref A comparator Com compares the error amplified signal V1 with a signal ViL representing an inductor current to determine a crossing point of the two signals, and generate a comparison signal Comp. Next, a one-shot pulse generator 15 generates a square wave signal PWM having the constant ON time. A driver circuit 13 controls the operation of a power stage 20 according to the square wave signal PWM to convert an input voltage Vin to the output voltage Vout, which is supplied to a load 30.

Figure 2:
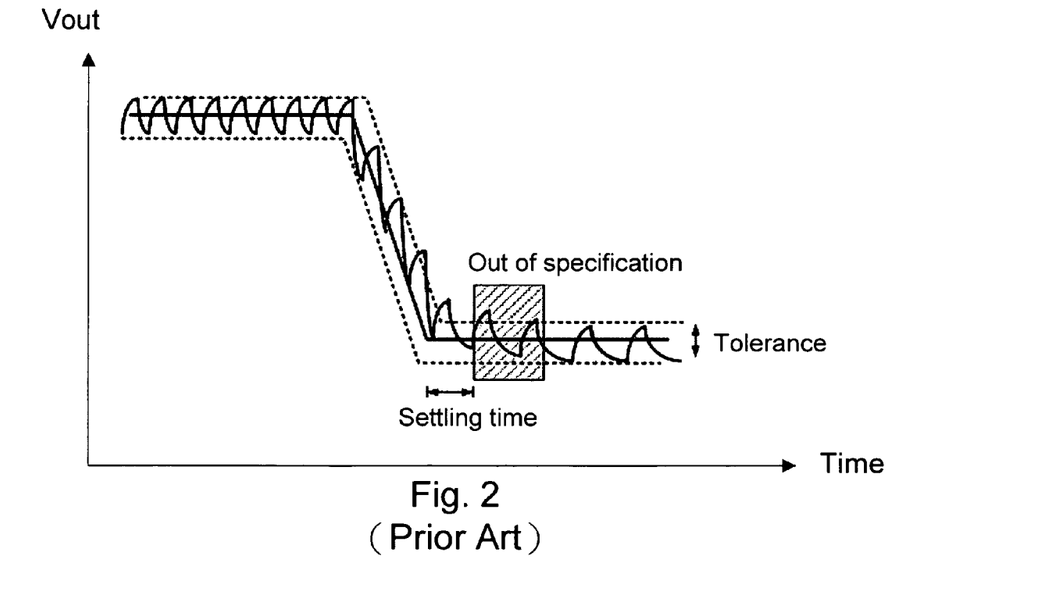
FIG. 2 shows the output voltage ripple of the prior art circuit during a transient period when an output voltage is shifted from high to low.
Figure 3:
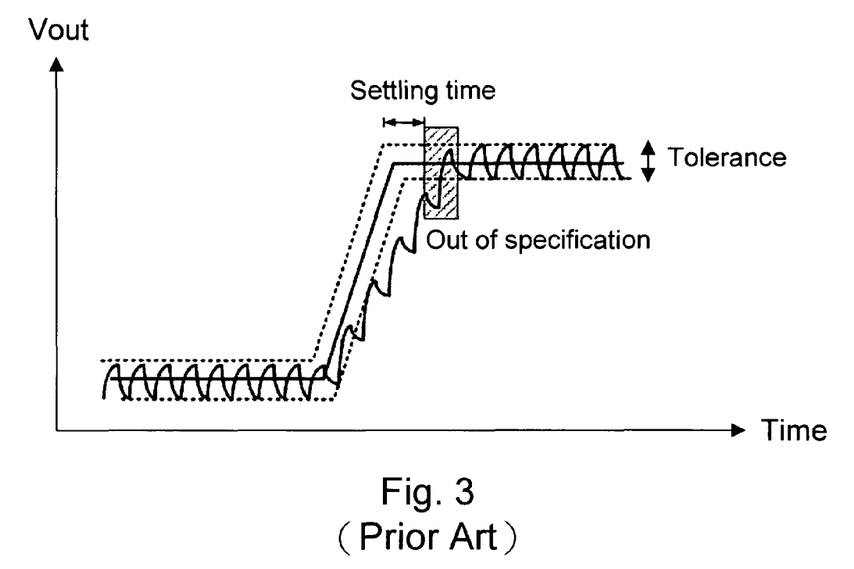
FIG. 3 shows the output voltage ripple of the prior art circuit during a transient period when the output voltage is shifted from low to high.

The prior art constant ON time switching regulator has a drawback that its response time is slow when the output voltage changes. Referring to FIG. 2, when the output voltage is shifted from high to low, the output voltage ripple generated in the prior art circuit can not converge in a tolerance band within a predefined settling time; instead, it is higher than the tolerance band and out of specification for a while after the predefined settling time. Similarly, referring to FIG. 3, when the output voltage is shifted from low to high, the output voltage ripple generated in the prior art circuit can not converge in the tolerance band within the predefined settling time, but is lower and out of specification for a while after the predefined settling time.

In view of the above, the present invention proposes an adaptive constant ON time adjustment circuit and a method for adaptively adjusting constant ON time for accelerating the response of the circuit during a transient period, to overcome the drawbacks in the prior art.

SUMMARY OF THE INVENTION

An objective of the present invention is to provide an adaptive constant ON time adjustment circuit.

Another objective of the present invention is to provide a method for adaptively adjusting constant ON time.

To achieve the foregoing objectives, in one perspective of the present invention, it provides an adaptive constant ON time adjustment circuit for controlling a power stage circuit to convert an input voltage to an output voltage and to provide an output current to a load, the adaptive constant ON time adjustment circuit comprising: a transient period detection circuit detecting a transient period indication signal and generating a transient ON time (transient TON) control signal; an ON time (TON) generation circuit generating a constant normal ON time and a longer or shorter transient ON time, the TON generation circuit determining an ON time of a square wave signal according to the transient TON control signal; and a driver circuit controlling the power stage according to the square wave signal, wherein when the transient period indication signal indicates that the power stage circuit is not in the transient period, the square wave signal generated by the TON generation circuit has the constant normal ON time; and wherein when the transient period indication signal indicates that the output voltage is shifted from high to low, during the transient period, the square wave signal generated by the TON generation circuit has the shorter transient ON time; or when the transient period indication signal indicates that the output voltage is shifted from low to high, during the transient period, the square wave signal generated by the TON generation circuit has the longer transient ON time.

In one embodiment of the foregoing adaptive constant ON time adjustment circuit, the TON generation circuit preferably comprises: a ramp generator generating a ramp signal; and an ON time comparator comparing the ramp signal with a reference signal to generate the square wave signal, wherein a slope or peak value of the ramp signal is controlled by the transient TON control signal.

The foregoing ramp generator may comprise a current source charging or discharging a capacitor to generate a ramp signal, wherein a current amount of the current source is controlled by the transient TON control signal.

In another perspective of the present invention, it provides an method for adaptively adjusting constant ON time to control a power stage circuit to convert an input voltage to an output voltage and to provide an output current to a load, the method comprising: detecting a transient period indication signal and generating a transient ON time (transient TON) control signal accordingly; determining an ON time of a square wave signal according to the transient TON control signal, the square wave signal having a constant normal ON time and a longer or shorter transient ON time; and controlling the power stage according to the square wave signal, wherein when the transient period indication signal indicates that the power stage circuit is not in the transient period, the square wave signal generated by the TON generation circuit has the constant normal ON time; and wherein when the transient period indication signal indicates that the output voltage is shifted from high to low, during the transient period, the square wave signal generated by the TON generation circuit has the shorter transient ON time; or when the transient period indication signal indicates that the output voltage is shifted from low to high, during the transient period, the square wave signal generated by the TON generation circuit has the longer transient ON time.

The objectives, technical details, features, and effects of the present invention will be better understood with regard to the detailed description of the embodiments below, with reference to the drawings.

DESCRIPTION OF THE PREFERRED EMBODIMENTS

In the following context, the present invention is embodied in a synchronous buck switching regulator as an example for explaining how an adaptive constant ON time adjustment circuit according to the present invention operates. However, please note that the present invention can be applied to any other type of synchronous or asynchronous switching regulators, not limited to the synchronous buck switching regulator.

Figure 4:
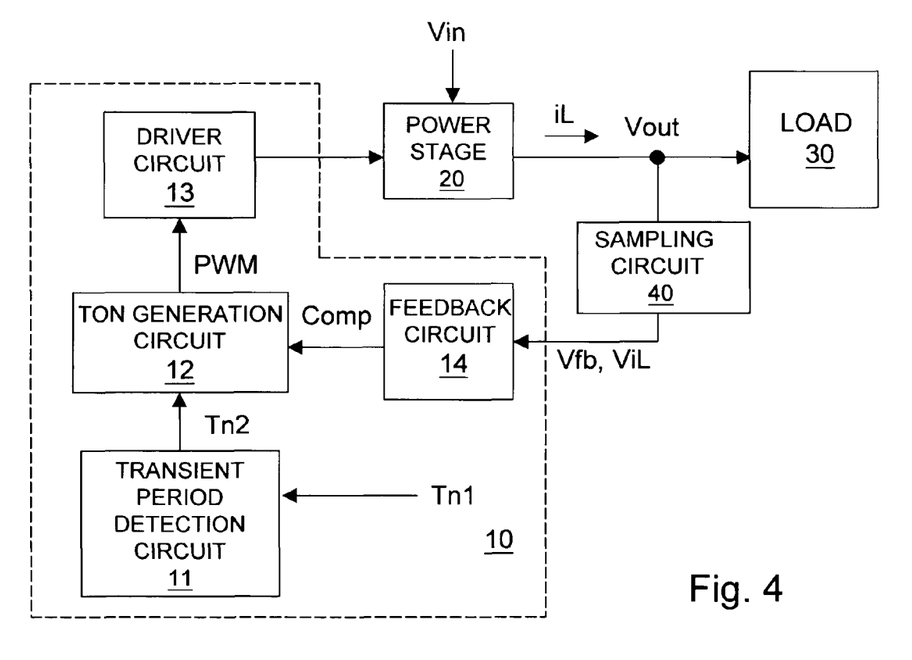
FIG. 4 is a schematic diagram of an adaptive constant ON time adjustment circuit according to the present invention.

Referring to FIG. 4 which shows a basic structure of the present invention, the adaptive constant ON time adjustment circuit 10 (hereafter referred to as "control circuit 10" for simplification) controls a power stage 20 to convert an input voltage Vin to an output voltage Vout, which is supplied to a load 30. The control circuit 10 comprises: a transient period detection circuit 11, an ON time (TON) generation circuit 12, a driver circuit 13 and a feedback circuit 14. The transient period detection circuit 11 generates a transient TON control signal Tn2 according to a transient period indication signal Tn1, and inputs the transient TON control signal Tn2 to the TON generation circuit 12. The transient period indication signal Tn1 is a signal related to the variation of the output voltage Vout, which can be generated in many ways, such as by detecting the output voltage Vout directly; or, in some applications, the load 30 will generate a signal if it intends to change the output signal Vout, so in this case the transient period indication signal Tn1 can be obtained or generated from the load 30 directly or indirectly. The TON generation circuit 12 determines an ON time of a square wave signal PWM according to the transient TON control signal Tn2 and a signal Comp from the feedback circuit 14. The driver circuit 13 drives the power stage 20 to perform power conversion according to the square wave signal PWM.

Figure 5:
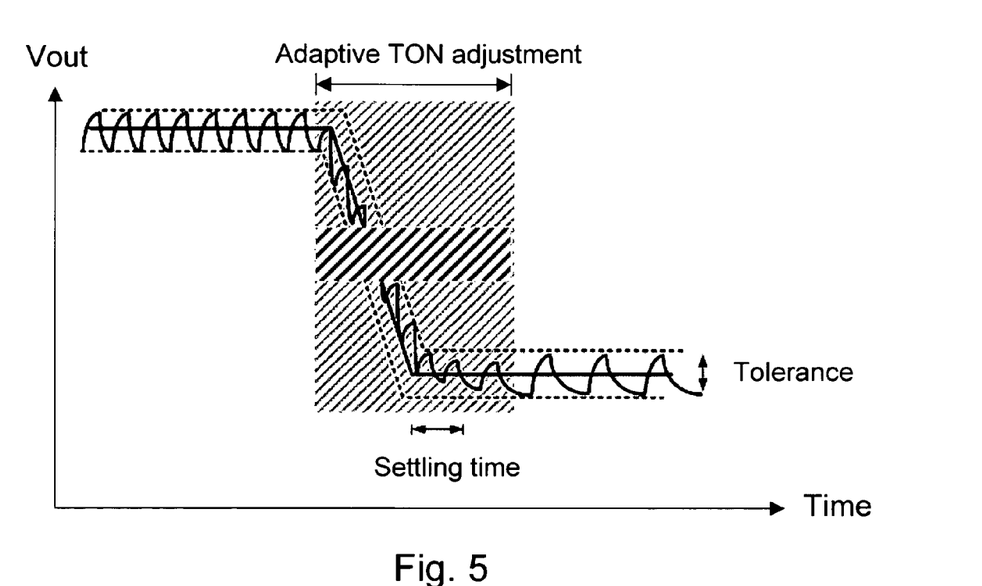
FIG. 5 shows the output voltage ripple of the present invention during a transient period when an output voltage is shifted from high to low.
Figure 6:
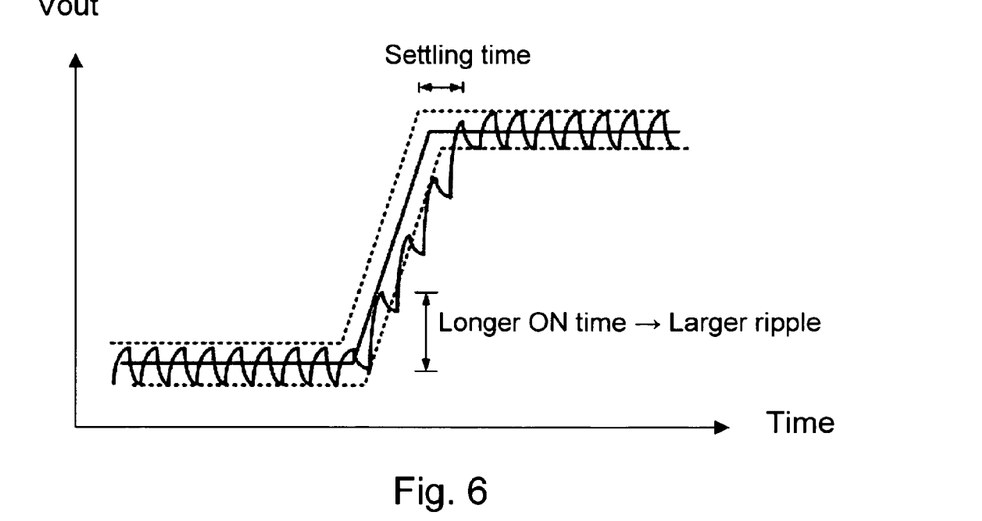
FIG. 6 shows the output voltage ripple of the present invention during a transient period when an output voltage is shifted from low to high.

In the present invention, when the TON generation circuit 12 is in normal operation, it generates a constant normal ON time. But when the output voltage Vout is changed, during a transient period, the TON generation circuit 12 adaptively generates a longer or shorter transient ON time. And after the circuit becomes stable, the TON generation circuit 12 switches back to generate the constant normal ON time. More specifically, referring to FIG. 5 in comparison with FIG. 2, when the output voltage Vout is shifted from high to low, the present invention adaptively adjusts the ON time of the square wave signal PWM to a shorter transient ON time to reduce the ripple of the output voltage Vout; thus, the output voltage Vout converge in the tolerance band in the predefined settling time instead of being higher than the tolerance band and out of specification. Referring to FIG. 6 and in comparison with FIG. 3, when the output voltage Vout is shifted from low to high, the present invention adaptively adjusts the ON time of the square wave signal PWM to a longer transient ON time to increase the ripple of the output voltage Vout; thus, the output voltage Vout converge in the tolerance band instead of being lower than the tolerance band and out of specification. The above comparisons show that the present invention converge in the tolerance band faster than the prior art.

Figure 7:
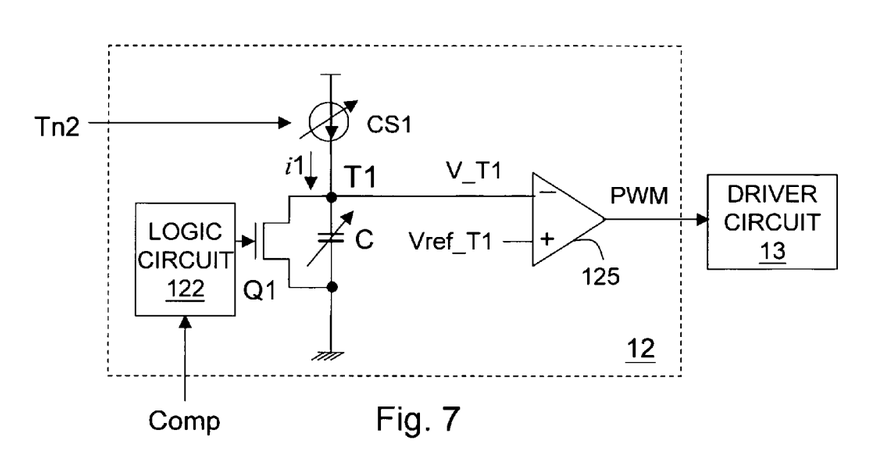
FIG. 7 shows an embodiment of the TON generation circuit in the present invention.

There are various ways to embody the TON generation circuit 12; one embodiment is shown in FIG. 7. As the figure shows, the square wave signal PWM is generated by a TON comparator 125 comparing the ramp signal V_T1 with a reference signal Vref_T1. The slope or peak value of the ramp signal V_T1 is adjustable and the ON time of the square wave signal PWM can be changed by changing the slope or peak value of the ramp signal V_T1. More specifically, a current source CS1, a capacitor C and a transistor switch Q1 construct a ramp signal generation circuit. The current source CS1 generates a current i1 to charge the capacitor C so as to generate the ramp signal V_T1 at a node T1. The gate of the transistor switch Q1 is controlled by an output of a logic circuit 122 to adjust the turned-ON timing of the transistor switch Q1, that is, the frequency of the ramp signal V_T1. In a preferred embodiment, the output of the logic circuit 122 is generated according to the signal Comp (the output of the feedback circuit in FIG. 4) so that the frequency of the ramp signal V_T1 can be feedback-controlled according to the output voltage and current supplied to the load.

Figure 8:
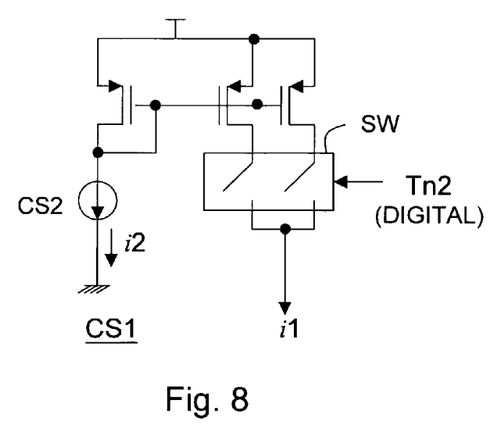
FIG. 8 shows an embodiment of the current source CS1 in the present invention.

According to the present invention, the slope of the ramp signal V_T1 can be changed by adjusting the current amount of the current source CS1, and the peak value of the ramp signal V_T1 can be changed by adjusting the capacitance of the capacitor C. The slope change of the ramp signal V_T1 is shown as an example. As the figure shows, the current amount of the current source CS1 is adjustable by the transient TON control signal Tn2, so that the ON time of the square wave signal PWM can be adjusted according to the transient TON control signal Tn2. The current source CS1 can be implemented in many ways, and one example is shown in FIG. 8, wherein a current mirror circuit, at the upper side, mirrors a current i2 generated by a current source CS2 at the left side to currents of circuits at the right side. If the transient TON control signal Tn2 is a digital signal, the transient TON control signal Tn2 can be used to determine which one(s) of switches SW should be conducted so that a ratio between the current it and the current i2 can be determined, that is, the current amount of the current source CS1 is adjusted according to the transient TON control signal Tn2. If the transient TON control signal Tn2 is an analog signal, the transient TON control signal Tn2 can be converted into a digital signal, or the analog transient TON control signal Tn2 can be used in other ways (to be described later).

Figure 9:
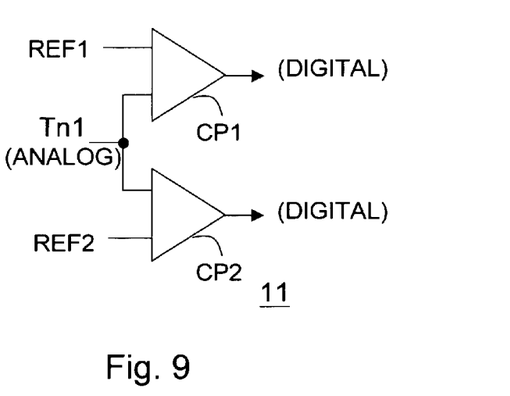
FIG. 9 shows an embodiment of the transient period detection circuit in the present invention.

If the transient period indication signal Tn1 is a digital signal, the transient period detection circuit 11 can be a simple decoder circuit which generates the digital transient TON control signal Tn2 according to the transient period indication signal Tn1. If the transient period indication signal Tn1 is an analog signal, the transient period indication signal Tn1 can be converted to the digital transient TON control signal Tn2 by, e.g., an analog-to-digital converter circuit or a mapping table circuit (not shown in the figure); or as FIG. 9 shows, the transient period detection circuit 11 can include comparators CP1 and CP2 comparing the transient period indication signal Tn1 with reference signals REF1 and REF2 respectively to convert the transient period indication signal Tn1 into the digital transient TON control signal Tn2. In FIGS. 8 and 9, the numbers of the switches SW and the comparators CP1 and CP2, and the bit number of the digital signals (the transient TON control signal Tn2 in digital form or the digital signal converted from it) are only examples which should not be taken as limitations; the numbers can be any other numbers not limited to the examples as shown.

According to present invention, preferably, the current amount of the current source CS2 is settable from outside of the circuit to provide larger flexibility. This can be embodied in various ways, such as one embodiment shown in FIG. 10, wherein a source follower circuit at the left side generates a current iset across a transistor Q2, and a current mirror circuit 127 mirrors the current iset to the current i2. When the circuit is in balanced at stable state, the voltages at the two input terminals of the error amplifier 126 are equal to each other, that is, Vset=iset×Rset. In other words, by setting the resistance of the resistor Rset, the current iset can be determined and the current i2 is correspondingly set; or, as FIG. 11 shows, by setting the resistance of the resistor Rset, the voltage Vset can be set to determined the current iset and the current i2 as well. Note that the transistors in the above circuits can be replaced by bipolar transistors instead of MOSFETs, and the locations of the resistors and current mirrors are changeable, as shown in FIG. 12.

Figure 10:
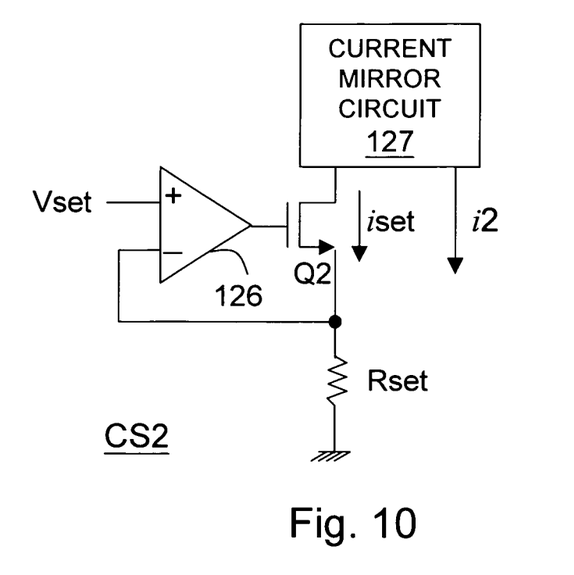
FIGS. 10-12 show three embodiments of a current source CS2 in the present invention.
Figure 11:
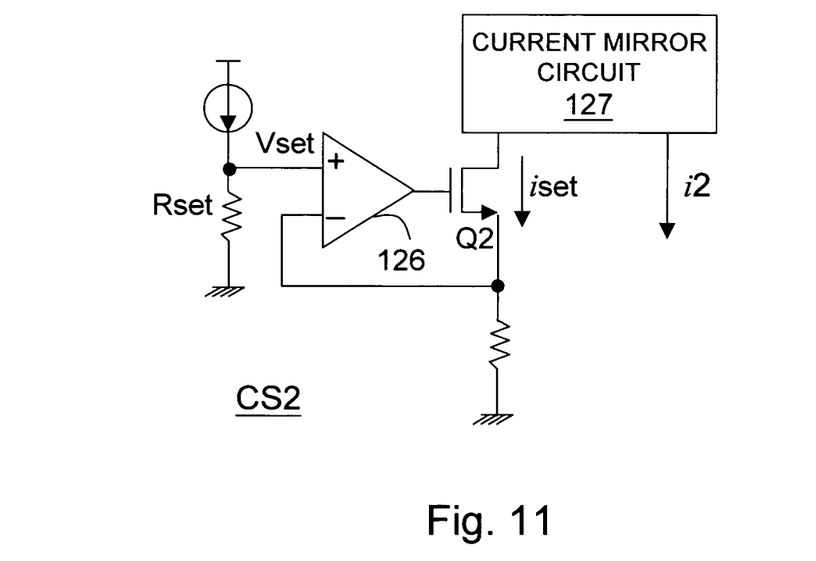
Figure 12:
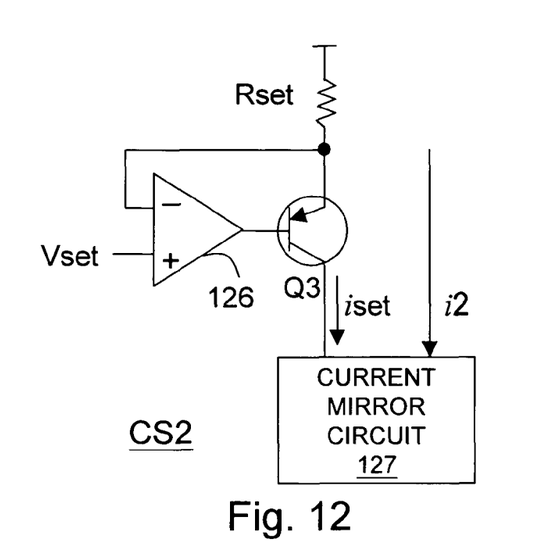
Figure 13:
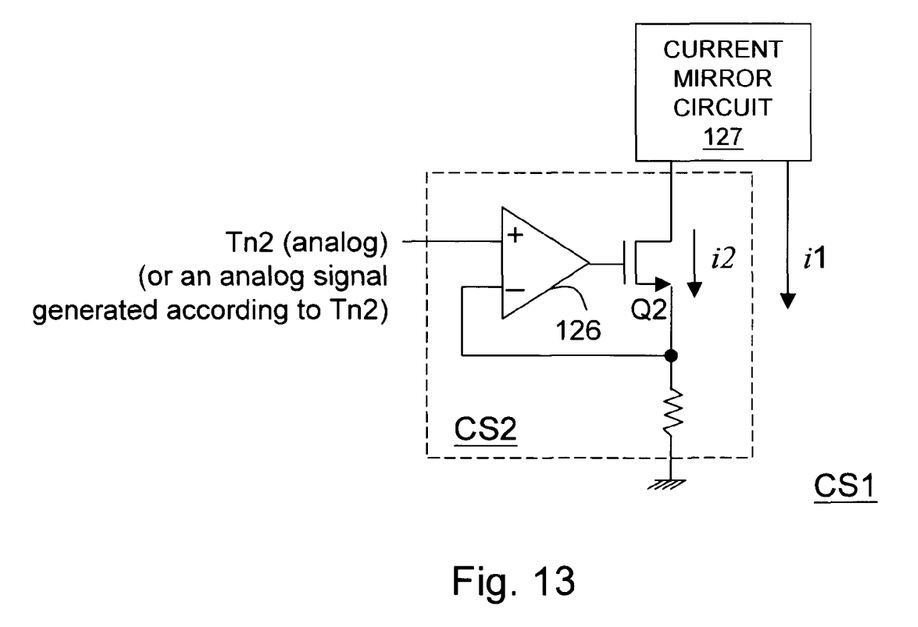
FIG. 13 shows another embodiment of the current source CS1 in the present invention.

As FIGS. 10-12 suggest, if the transient TON control signal Tn2 is an analog signal, the analog transient TON control signal Tn2 can be taken as the reference voltage Vset, and the current amount of the current source CS1 can also be adjusted according to the transient TON control signal Tn2, which is shown in FIG. 13. Certainly, it is not necessary for the reference voltage Vset to be the transient TON control signal Tn2 itself, but also can be an analog signal generated according to the transient TON control signal Tn2. Anyhow, as illustrated by the present invention, the transient period detection circuit 11 and the current source CS1 in the TON generation circuit 12 can be designed according to different forms of the transient period indication signal Tn1 and the transient TON control signal Tn2, to achieve the same purpose of adjusting the ON time of the square wave signal PWM according to the transient TON control signal Tn2. All such variations and modifications should be interpreted to fall within the scope of the present invention.

Figure 14:
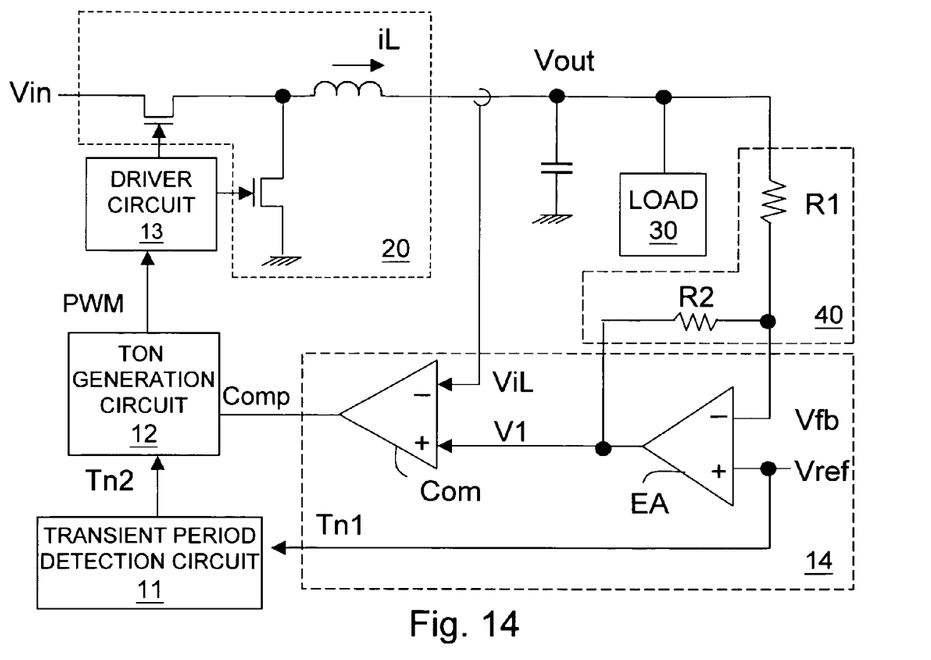
FIG. 14 shows a more specific embodiment of the circuit shown in FIG. 4, wherein it is assumed that if a load 30 generates a signal to change the output voltage Vout, it also changes the reference voltage Vref.

FIG. 14 shows a more specific embodiment of the circuit shown in FIG. 4. In this embodiment, it is assumed that when the load 30 generates a signal to change the output voltage Vout, this signal also changes the reference voltage Vref, so the transient period indication signal Tn1 can be derived from the reference voltage Vref. Certainly, as what is mentioned above, the transient period indication signal Tn1 can be derived from other sources not be limited only to the reference voltage Vref, such as by detecting the output voltage Vout, or obtained from the load 30 directly or in any other form.

Figure 15:
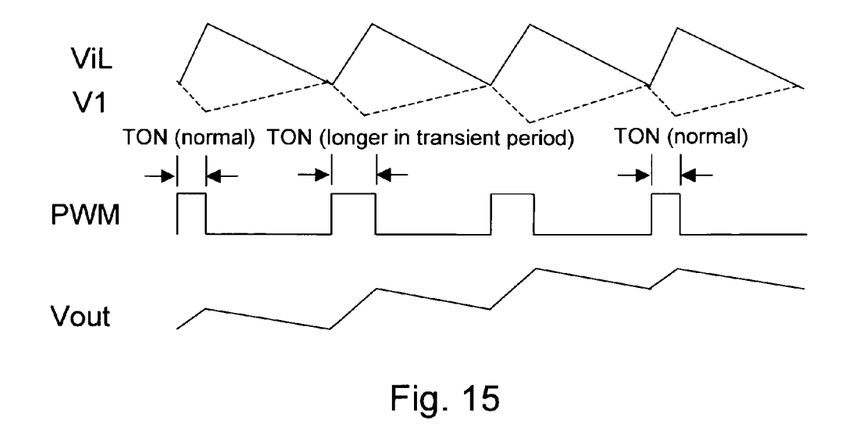
FIG. 15 shows waveforms of the signal Vil, the signal V1, the square wave signal PWM and the output voltage Vout in normal operation and in a transient period (from low to high).
Figure 16A:
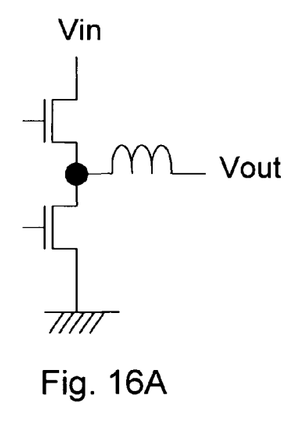
FIGS. 16A-16F show several embodiments of the power stage of a switching regulator.
Figure 16B:
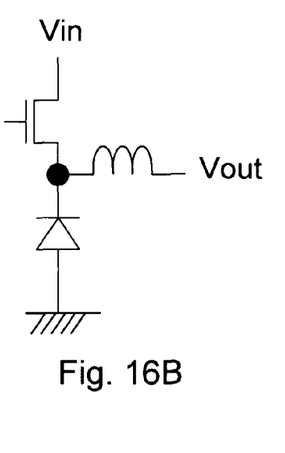
Figure 16C:
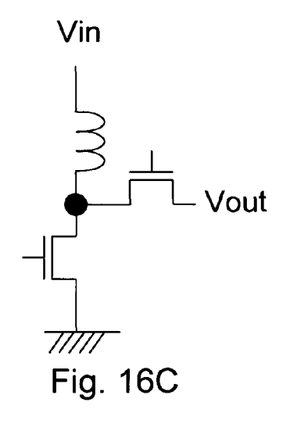
Figure 16D:
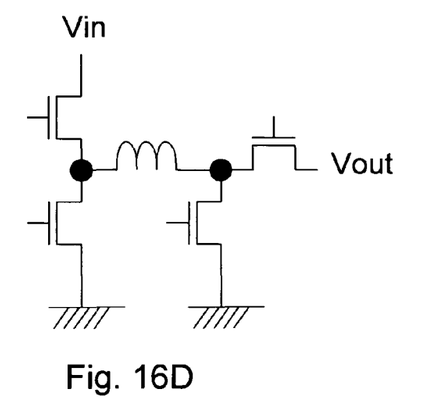
Figure 16E:
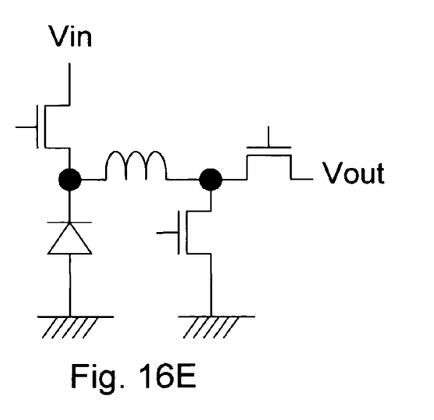
Figure 16F:
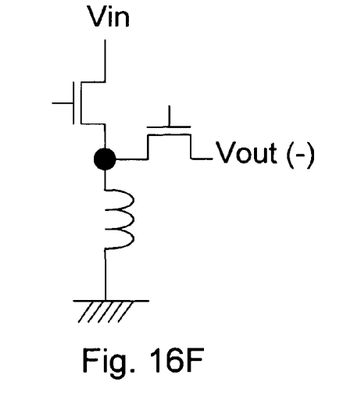

Referring to FIG. 15, which shows examples of the waveforms of the signal Vil, the signal V1, the square wave signal PWM and the output voltage Vout. The crossing point of the signal Vil and the signal V1 determines the starting point of the ON time of the square wave signal PWM (hence the frequency of the square wave signal PWM), and the TON generation circuit 12 determines the ON time (TON) of the square wave signal PWM. The circuit is in a normal operation in the beginning, but when the output voltage Vout is shifted from low to high, during the transient period, the square wave signal PWM has a longer transient ON time, and then, after the output voltage Vout arrives at the target level, the square wave signal PWM switches back to the normal ON time (TON) again. Similarly, when the output voltage Vout is shifted from high to low, during the transient period, the square wave signal PWM has a shorter transient ON time, which is not shown in the figure for simplicity.

Figure 17:
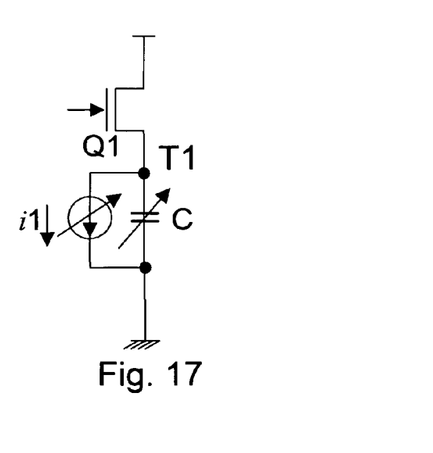
FIG. 17 shows another embodiment of a ramp signal generation circuit.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, although the present invention adjusts the ON time both when the output voltage Vout is shifted from high to low and from low to high, it is possible to adjust the ON time only in one of the two cases. As another example, the power switch in the power stage 20 and the transistor Q1 in the ramp signal generation circuit can be NMOSFET or PMOSFET. As yet another example, the power stage of the present invention should not be limited to a synchronous buck converter, but also can be synchronous or asynchronous buck, boost, inverting or buck-boost converter as shown in FIGS. 16A-16F. Further, in the ramp signal generation circuit of FIG. 7, the current source charges the capacitor, but it also can be modified so that the current source discharges the capacitor, as shown in FIG. 17. Thus, the present invention should cover all such and other modifications and variations, which should be interpreted to fall within the scope of the following claims and their equivalents.

What is claimed is:

1. An adaptive constant ON time adjustment circuit for controlling a power stage circuit to convert an input voltage to an output voltage and to provide an output current to a load, the output voltage including at least a high voltage stable status and a low voltage stable status and being capable of shifting between the high and low voltage stable statuses, wherein a time period for shifting from one stable status to another stable status is a transient period, the adaptive constant ON time adjustment circuit comprising:

a transient period detection circuit detecting a transient period indication signal and generating a transient ON time (transient TON) control signal;

an ON time (TON) generation circuit generating a constant normal ON time and a longer or shorter transient ON time, the TON generation circuit determining an ON time of a square wave signal according to the transient TON control signal; and a driver circuit controlling the power stage according to the square wave signal, wherein when the transient period indication signal indicates that the power stage circuit is not in the transient period, the square wave signal generated by the TON generation circuit has the constant normal ON time; and wherein when the transient period indication signal indicates that the output voltage is shifted from high to low, during the transient period, the square wave signal generated by the TON generation circuit has the shorter transient ON time; and when the transient period indication signal indicates that the output voltage is shifted from low to high, during the transient period, the square wave signal generated by the TON generation circuit has the longer transient ON time.

2. The adaptive constant ON time adjustment circuit of claim 1, wherein the transient period indication signal is from the inside of the adaptive constant ON time adjustment circuit or the load.

3. The adaptive constant ON time adjustment circuit of claim 1, wherein the TON generation circuit comprises:
a ramp generator generating a ramp signal; and
an ON time comparator comparing the ramp signal with a reference signal to generate the square wave signal, wherein a slope or peak value of the ramp signal is controlled by the transient TON control signal.

4. The adaptive constant ON time adjustment circuit of claim 1, further comprising a feedback circuit generating an output signal according to the output voltage and the output current, as an input to the TON generation circuit to determine a frequency of the square wave signal, wherein the TON generation circuit comprises:
a first current source whose current amount is controlled by the transient TON control signal;
a capacitor coupled to the first current source at a first node;
a first transistor coupled to the first node between the first current source and the capacitance;
a logic circuit receiving the output signal from the feedback circuit to control an operation of the first transistor; and
an ON time comparator comparing a voltage at the first node with a first reference voltage to generate the square wave signal.

5. The adaptive constant ON time adjustment circuit of claim 4, wherein the first current source comprises: a second current source and a current mirror circuit which mirrors a current generated by the second current source to a current of the first current source, wherein a ratio between the current generated by the second current source and the current of the first current source is controlled by the transient TON control signal.

6. The adaptive constant ON time adjustment circuit of claim 5, wherein the current generated by the second current source is settable from outside.

7. The adaptive constant ON time adjustment circuit of claim 4, wherein the first current source comprises a second current source and a current mirror circuit which mirrors a current generated by the second current source to a current of the first current source, wherein the second current source comprises:
a second transistor;
a resistor coupled to the second transistor at a second node; and
an error amplifier comparing a voltage at the second node with a second reference voltage to generate an output controlling the second transistor, wherein the second reference voltage is the transient TON control signal or an analog signal generated according to the transient TON control signal.

8. An method for adaptively adjusting constant ON time to control a power stage circuit to convert an input voltage to an output voltage and to provide an output current to a load, the output voltage including at least a high voltage stable status and a low voltage stable status and being capable of shifting between the high and low voltage stable statuses, wherein a time period for shifting from one stable status to another stable status is a transient period, the method for adaptively adjusting constant ON time comprising:
detecting a transient period indication signal and generating a transient ON time (transient TON) control signal accordingly;
determining an ON time of a square wave signal according to the transient TON control signal, the square wave signal having a constant normal ON time and a longer or shorter transient ON time; and
controlling the power stage according to the square wave signal,
wherein when the transient period indication signal indicates that the power stage circuit is not in the transient period, the square wave signal generated by the TON generation circuit has the constant normal ON time; and
wherein when the transient period indication signal indicates that the output voltage is shifted from high to low, during the transient period, the square wave signal generated by the TON generation circuit has the shorter transient ON time; and when the transient period indication signal indicates that the output voltage is shifted from low to high, during the transient period, the square wave signal generated by the TON generation circuit has the longer transient ON time.

9. The method of claim 8, wherein the step of determining an ON time of a square wave signal according to the transient TON control signal comprises:
generating a ramp signal;
controlling a slope or peak value of the ramp signal according to the transient TON control signal; and
comparing the ramp signal with a reference signal to generate the square wave signal.

10. The method of claim 9, wherein the step of generating a ramp signal comprises: charging or discharging a capacitor by a current source; and the step of controlling a slope or peak value of the ramp signal by the transient TON control signal comprise: controlling a current amount of the current source by the transient TON control signal.

* * * * *